Patented June 8, 1937

2,083,176

UNITED STATES PATENT OFFICE 2,083,176

LUBRICATION OF RUBBER

George F. Willson, Cleveland Heights, Ohio, assignor to Acheson Colloids Corporation, New York, N. Y., a corporation of New York No Drawing. Application June 29, 1935, Serial No. 29,174

5 Claims. (Cl. 87—9)

This invention relates to improvements in the lubrication of rubber, particularly mechanical elements made of, or including, rubber or other materials subject to damage by oil lubrication, and to new rubber lubricating compositions.

The use of rubber parts in machines of various sorts has greatly increased in the last few years. The utilization of rubber mechanical elements is particularly noteworthy in the automotive industry, where the use of rubber in the spring shackles of automobiles is very common. Rubber is also used in weigh bar bearings, trunnions, axle spring seats, motor mountings, individual suspension controller arm bearings, shock absorber links, silence strips, fan belts and the like.

The lubrication of rubber parts on automobiles and other mechanism has presented a troublesome problem because of the softening action of the usual lubricating agents and compositions, such as lubricating oil on rubber.

It has now been found that very effective and lasting lubrication of rubber mechanical elements may be obtained by the use of compositions comprising a finely divided foliaceous material, particularly graphite, a viscous, water-miscible, highly hygroscopic substance, such as glycerol or glycol, and water. Compositions containing graphite, at least a portion of which is in colloidal or semi-colloidal form, are particularly effective. For some purposes all or a part of the graphite may be replaced by other finely divided materials, such as mica, vermiculite, talc, and similar foliaceous substances.

The amount of colloidal or deflocculated graphite, or other foliaceous material, in the compositions may be relatively small, for example, 0.05 to 0.5%. Further amounts of powdered graphite, for example, up to 2%, may also be advantageously added to the composition. The addition of colloidal materials and deflocculating or wetting agents is also advantageous for some purposes, especially when the compositions contain powdered graphite.

The presence of glycerol or the like in the lubricating compositions has been found to have a number of valuable advantages. It is hygroscopic and prevents drying out of the lubricant composition, thus keeping the lubricated parts moist and free from squeaks. It greatly lowers the freezing point of the composition and enables the new lubricants to be used effectively throughout the winter. It increases the viscosity of the compositions, which adds to the ease of handling and applying the lubricants and increases the retention of the lubricants on the lubricated part. The glycerol also has a definite lubricating effect and is entirely harmless to rubber.

The amount of glycerol or its equivalent in the compositions should be sufficient to impart a suitable viscosity to the compositions and to reduce the freezing point to a relatively low temperature. In general the use of substantially equal proportions of glycerol and water is satisfactory.

The finely divided foliaceous materials, such as colloidal and semi-colloidal graphite, in the compositions are primarily beneficial because of their permanent nature and ability to reduce squeaks between rubbing parts. These substances are inert, and harmless to rubber and other materials. When they are of suitable fineness they penetrate into small apertures and form highly effective friction-reducing films of great permanence.

A highly suitable source of colloidal and semi-colloidal graphite for use in producing the lubricant compositions of the invention is found in the products sold under the trade-marks "Aquadag", "Prodag" and "Glydag", which are, respectively, a suspension of colloidal graphite in water, a suspension of colloidal graphite and powdered graphite in water, and a suspension of colloidal graphite in glycerol.

Colloidal materials having thixiotropic properties, such as bentonite, may be used to increase the body of the compositions and to promote the suspension of the foliaceous particles. Dispersing or wetting agents, such as sodium oleate, aid in the penetration of the lubricant compositions and increase their lubricating effect.

The following examples of compositions embodying the principles of the invention are given for the purpose of illustration:

Example 1

| | |
|---|---|
| Colloidal graphite | 0.2% |
| Glycerol | 50.0% |
| Water | Remainder |

Example 2

| | |
|---|---|
| Colloidal graphite | .075% |
| Powdered graphite | 1.425% |
| Bentonite | .15% |
| Sodium oleate | .0015% |
| Glycerol | 50.0% |
| Water | Remainder |

The graphite in the foregoing examples may be replaced in whole or in part by other finely divided foliaceous materials, such as mica, vermiculite, and talc. The proportions of the various elements of the composition may be varied widely without departing from the principles of the invention.

The lubricant compositions of the invention may be applied to the parts to be lubricated by any of the methods now in use for applying lubricants. For example, they may be applied to exposed parts with a brush. Less accessible parts may be lubricated with a spray gun or squirt gun, or with other suitable means.

I claim:

1. A lubricant for rubber bearing members comprising about .2% of finely divided graphite, substantially 50% glycerol and substantially the same amount of water as that of glycerol.

2. A lubricant for rubber bearing members comprising colloidal graphite .075%, powdered graphite 1.425%, bentonite .15%, sodium oleate .0015%, glycerol 50.0% and the remainder water.

3. A lubricant for rubber bearing members comprising 0.05% to 0.5% of colloidal graphite, substantially 50% glycerol and substantially the same amount of water as that of glycerol.

4. A lubricant for rubber bearing members comprising 0.05 to 2.0% of finely divided graphite, about 50% of glycerol and substantially the same amount of water as that of glycerol.

5. A lubricant for rubber bearing members comprising finely divided graphite, bentonite and sodium oleate in an amount not substantially exceeding 2.0% of the total composition, the remainder being glycerol and water in substantially equal proportions to make a total of 100 per cent.

GEORGE F. WILLSON.